United States Patent
Kim et al.

(10) Patent No.: US 8,054,813 B2
(45) Date of Patent: *Nov. 8, 2011

(54) METHOD OF TRANSMITTING AGGREGATED MAC MPDUS IN WLAN SYSTEM AND SYSTEM THEREFOR

(75) Inventors: Young-Soo Kim, Seoul (KR); Sunghyun Choi, Seoul (KR); Alexey Sidelnikov, Seoul (KR); Kyung-Hun Jang, Suwon-si (KR); Hyo-Sun Hwang, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 304 days.

This patent is subject to a terminal disclaimer.

(21) Appl. No.: 11/649,113

(22) Filed: Jan. 3, 2007

(65) Prior Publication Data

US 2007/0153757 A1 Jul. 5, 2007

Related U.S. Application Data

(60) Provisional application No. 60/755,831, filed on Jan. 3, 2006.

(30) Foreign Application Priority Data

Jun. 7, 2006 (KR) .................. 10-2006-0051070

(51) Int. Cl.
*H04W 4/00* (2009.01)

(52) U.S. Cl. ........ 370/338; 370/389; 455/501; 455/517; 455/296

(58) Field of Classification Search .................. 370/338, 370/389, 352, 235; 710/748; 455/5.1, 517, 455/296

See application file for complete search history.

(56) References Cited

U.S. PATENT DOCUMENTS

| 7,161,909 | B2 * | 1/2007 | Sharma ..................... 370/235 |
| 2004/0146067 | A1 * | 7/2004 | Yi et al. ..................... 370/474 |
| 2005/0015703 | A1 * | 1/2005 | Terry et al. .................. 714/776 |
| 2005/0053066 | A1 * | 3/2005 | Famolari .................... 370/389 |
| 2005/0195858 | A1 * | 9/2005 | Nishibayashi et al. ....... 370/474 |

(Continued)

FOREIGN PATENT DOCUMENTS

KR 10-20040058502 7/2004

(Continued)

OTHER PUBLICATIONS

"802.11 Wireless Networks The Definitive Guide" Second Edition, Matthew S. Gast, Book published by O'Reilly, Apr. 2005, ISN-10: 0-596-10052-3.*

*Primary Examiner* — Kamran Afshar
*Assistant Examiner* — Shahriar Behnamian
(74) *Attorney, Agent, or Firm* — NSIP Law (57) ABSTRACT

Provided are a system and method of transmitting an Aggregated Media Access Control (MAC) Protocol Data Unit (A-MPDU) in a Wireless Local Area Network (WLAN) system. A MAC layer divides service data transferred from an upper layer into a plurality of MPDUs, forms a single transmission frame including the sequentially arranged MPDUs, delimiter information for distinguishing each of the MPDUs, and ACK request information for requesting for a reception result of the MPDUs, and transmits the formed transmission frame to a recipient. Accordingly, service coverage is extended, and a transmission delay is minimized, resulting in improved service efficiency.

22 Claims, 9 Drawing Sheets

U.S. PATENT DOCUMENTS

| | | | |
|---|---|---|---|
| 2006/0013176 A1* | 1/2006 | De Vos et al. | 370/338 |
| 2006/0107166 A1* | 5/2006 | Nanda | 714/748 |
| 2006/0136614 A1* | 6/2006 | Kakani et al. | 710/30 |
| 2006/0140172 A1* | 6/2006 | Trainin | 370/352 |
| 2006/0229083 A1* | 10/2006 | Redi | 455/453 |
| 2008/0031200 A1* | 2/2008 | Tang | 370/338 |

FOREIGN PATENT DOCUMENTS

| | | |
|---|---|---|
| KR | 10-20050050464 | 5/2005 |
| WO | WO 2005/004500 | 1/2005 |
| WO | WO 2005/112354 | 11/2005 |
| WO | WO 2005/112355 | 11/2005 |

* cited by examiner

IEEE 802.1e Block ACK

FIG.8A

Compressed Block ACK

FIG.8B

IEEE 802.1e Block ACK

FIG.9A

Compressed Block ACK

FIG.9B

METHOD OF TRANSMITTING AGGREGATED MAC MPDUS IN WLAN SYSTEM AND SYSTEM THEREFOR

PRIORITY

This application claims priority under 35 U.S.C. §119 to a provisional application entitled "The Impact Of The Packet Aggregation On The IEEE 802.11 WLANS Performance" filed in the United States Patent and Trademark Office on Jan. 3, 2006 and assigned Ser. No. 60/755,831 and to an application entitled "Method of Transmitting Aggregated MAC MPDUs in WLAN System and System Therefor" and filed in the Korean Intellectual Property Office on Jun. 7, 2006 and assigned Serial No. 2006-51070, the contents of which are incorporated herein by reference.

BACKGROUND OF THE INVENTION

1. Field of the Invention

The present invention relates generally to a wireless communication system, and in particular, to a method of more efficiently transmitting service data in a Wireless Local Area Network (WLAN) system and a system therefor.

2. Description of the Related Art

Recently, accompanying the development of wireless communication technology and the spread of wireless devices, there have been significant increases in the demands for high speed, reliable data transmission through a wireless link. A WLAN developed in response to the demands generally includes Stations (STAs), which are portable data communication devices, and Access Points (APs) for exchanging data with the STAs. An AP and STAs locating in the same wireless service coverage are called a Base Service Set (BSS).

Each of STAs locating in a single wireless service coverage area transmits or receives data using a wireless resource assigned by an AP. The AP assigns the wireless resource as a type of phase resource indicating a period of time for which an STA or the AP can transmit data.

Figure 1:
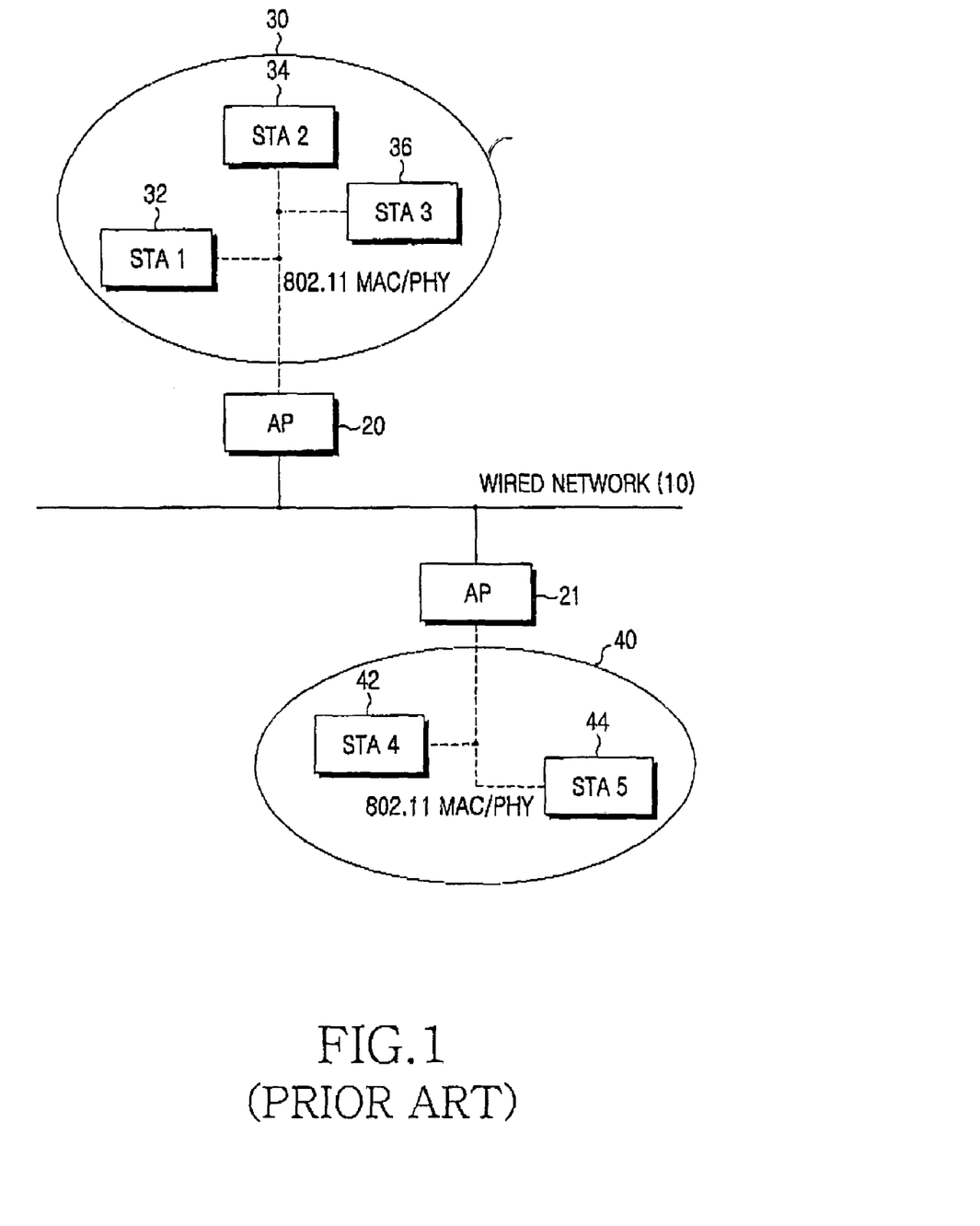
FIG. 1 illustrates a configuration of a WLAN system to which the present invention is applied.

FIG. 1 illustrates a configuration of a WLAN system to which the present invention is applied.

Referring to FIG. 1, APs 20 and 21 are connected to a wired network 10, and each of a plurality of STAs 32, 34, 36, 42 and 44 transmits or receives data via each of a plurality of wireless channels by being connected to the AP 20 or 21 via a wireless link according to an IEEE 802.11 series Physical (PHY) layer and a Media Access Control (MAC) protocol. The STAs 32, 34 and 36 located in a wireless service coverage 30 and the AP 20 form a single BSS, and the STAs 42 and 44 located in a wireless service coverage 40 and the AP 21 form another single BSS. STAs located in the same wireless service coverage can exchange data via an AP in the same BSS. Major functions of the APs 20 and 21 are transport of data traffic, access to another network (e.g., the wired network 10), support of roaming, synchronization in the same BSS, support of power management and MAC for supporting a time-bound service in the same BSS.

In particular, a MAC layer of each of the APs 20 and 21 or each of the plurality of STAs 32, 34, 36, 42, and 44 controls data transmission and acts as a core element in the WLAN system. The MAC layer defines a Distributed Coordination Function (DCF), which controls every STA requiring a wireless media access in an asynchronous transmission method to have a single First-Input First-Output (FIFO) transmission queue.

Thus, in a DCF mode, the MAC layer examines whether a wireless medium is busy and considers a certain back-off time at an end time of each frame after a certain STA uses a channel, in order to prevent collision of the wireless medium. The MAC layer also determines, using a positive acknowledgement responding to a frame transmitted through the wireless medium, whether a re-transmission request of the transmitted frame is input from a recipient.

The MAC layer uses an Inter-Frame Space (IFS) to define the least amount of time for waiting until a next operation after sensing that the wireless medium is in an idle state. Various types of priorities are provided using the IFS, wherein a smaller IFS value causes a higher priority.

A Distributed IFS (DIFS) indicates a time interval used to transmit user data or a management frame of an STA operating in the DCF mode. A Shorter IFS (SIFS) indicates a highest priority time interval from when a single frame is transmitted to when an Acknowledgement (ACK) frame responding to the frame is transmitted. The SIFS has a fixed value according to a PHY layer considering the time taken until an STA can receive another frame after transmitting a frame.

Figure 2:
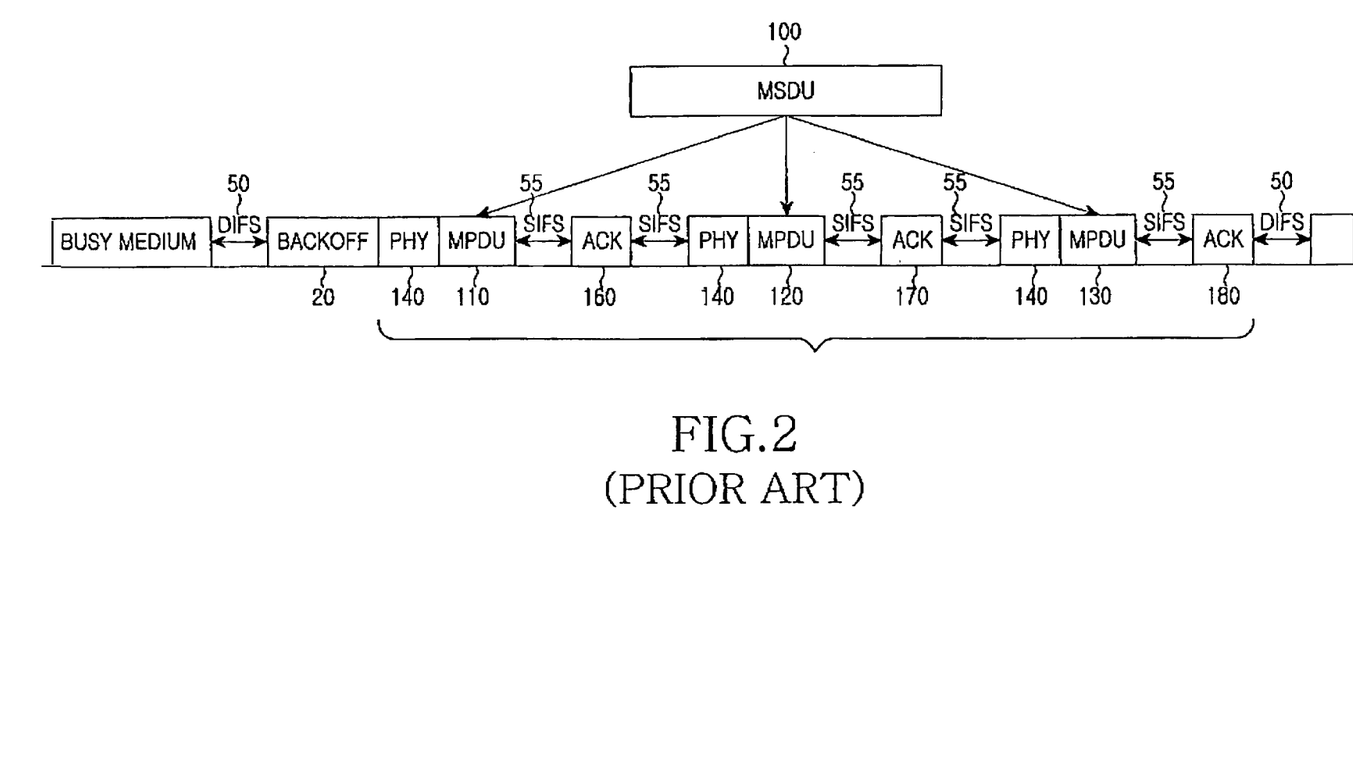
FIG. 2 is a diagram for explaining a fragmentation method in which a MAC layer transmits data in a WLAN system.

FIG. 2 is a diagram for explaining a fragmentation method in which a MAC layer transmits data in a WLAN system.

A MAC layer, which has received data from an upper layer, e.g., a Logical Link Control (LLC) layer, divides a MAC Service Data Unit (MSDU) into smaller frame fragments than an original frame and transmits the divided frame fragments. That is, since a long frame has limited reception reliability according to a channel state, transmission reliability of the long frame can be secured by dividing the long frame into small frame fragments using the fragmentation method.

Referring to FIG. 2, the MAC layer compares a received MSDU 100 to a fragmentation threshold, which is a parameter used in the MAC layer, and if the size of the MSDU 100 is greater than the fragmentation threshold, the MAC layer divides the MSDU 100 into small MAC fragments. Herein, the size of the minimum MAC fragment can be set to 256 bytes. Each of the MAC fragments includes a MAC frame (MPDU: MAC Packet Data Unit) 110, 120 or 130 having a MAC header. The MPDUs 110, 120 and 130 are transferred to a PHY layer, and a Physical Layer Convergence Protocol (PLCP) header and a preamble are added to each of the MPDUs 110, 120 and 130 in the PHY layer. A PHY header 140, i.e., the PLCP header and the preamble, and each of the MPDUs 110, 120 and 130 are called a PLCP Protocol Data Unit (PPDU) and are transmitted to a recipient via a wireless channel.

Thus, the MSDU 100 transmitted by the MAC layer in a time axis can be described as follows.

The MAC layer, which has sensed that a wireless medium is in the idle state, transmits a first MPDU 110 including the PHY header 140, i.e., a first PPDU, after considering a back-off time 20 next to a DIFS 50. After waiting for an SIFS 55, the MAC layer receives an ACK 160 from the recipient in response to the first MPDU 110 including the PHY header 140. After waiting for another SIFS 55, the MAC layer transmits a second MPDU 120 including the PHY header 140. After waiting for another SIFS 55, the MAC layer receives an ACK 170 from the recipient in response to the second MPDU 120. After waiting for another SIFS 55, the MAC layer transmits a third MPDU 130 including the PHY header 140. After waiting for another SIFS 55, the MAC layer receives an ACK 180 from the recipient in response to the third MPDU 130.

The MAC layer, which has completely transmitted the MSDU 100, transmits a subsequent MSDU through the above-described transmission procedures after considering another DIFS 50.

As described above, the fragmentation method guarantees the transmission reliability of each of the MPDUs 110, 120, and 130 by dividing the single MSDU 100 into a plurality of small MPDUs 110, 120 and 130, sequentially transmitting the MPDUs 110, 120 and 130, and receiving each of the ACKs 160, 170 and 180 responding to each of the MPDUs 110, 120 and 130 after waiting for the SIFS 55. On the contrary, the fragmentation method delays data transmission due to a time delay corresponding to the length of the SIFS 55 in each of the ACKs 160, 170 and 180 responding to each of the MPDUs 110, 120, and 130, resulting in a decrease of a system performance.

Figure 3:
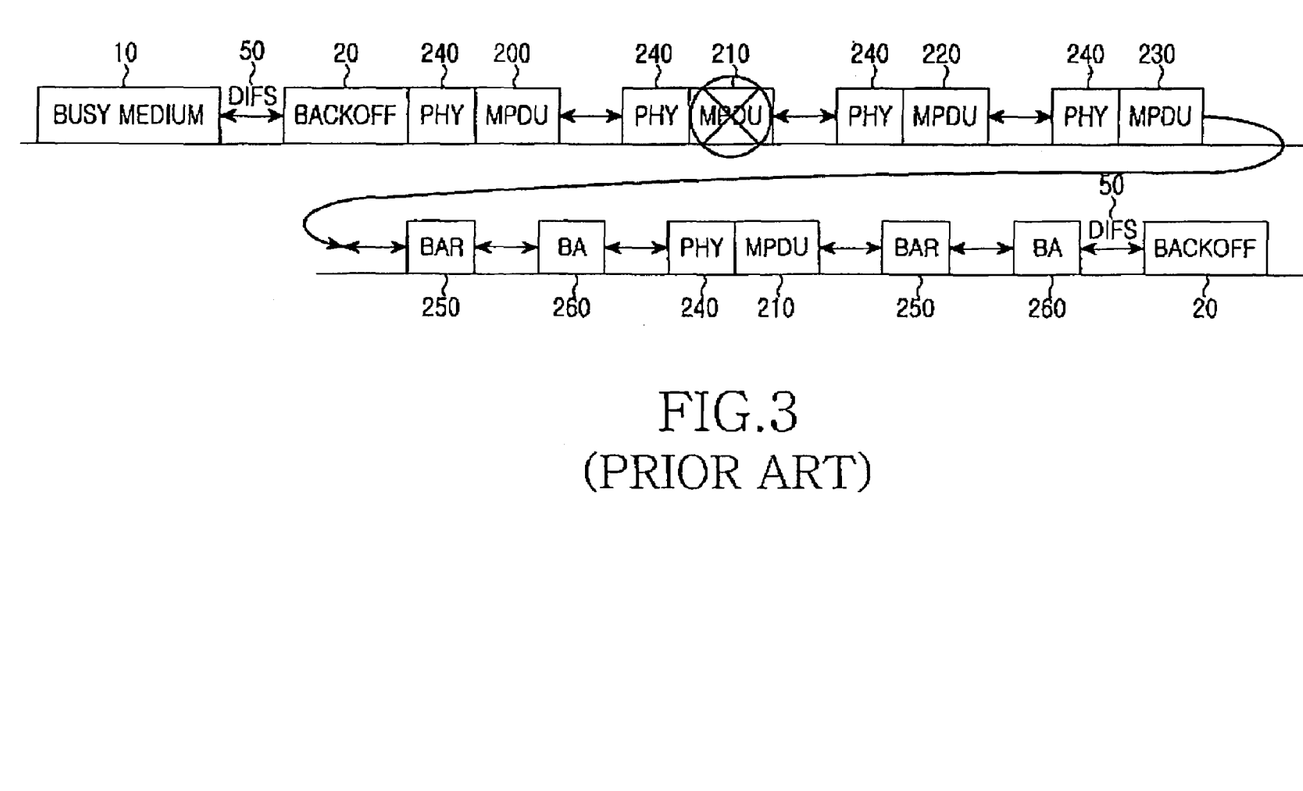
FIG. 3 is a diagram for explaining a BA method in which a MAC layer transmits data in a WLAN system.

FIG. 3 is a diagram for explaining a Block Acknowledgement (BA) method in which a MAC layer transmits data in a WLAN system. The BA method is a method of transmitting a frame including a plurality of divided small MAC frames and transmitting a subsequent frame without receiving ACKs responding to the MAC frames. Herein, an STA receives a bitmap type BA indicating whether the MAC frames were successfully transmitted.

Referring to FIG. 3, the MAC layer, which has sensed that a wireless medium is in the idle state, sequentially transmits a first MPDU 200 including a PHY header 240, a second MPDU 210 including the PHY header 240, a third MPDU 220 including the PHY header 240 and a fourth MPDU 230 including the PHY header 240 after considering a back-off time 20 next to a DIFS 50. Thereafter, the MAC layer requests a recipient for an ACK signal responding to the transmitted first to fourth MPDUs 200 to 230 in order to confirm whether the recipient has normally received the transmitted first to fourth MPDUs 200 to 230. Herein, the ACK signal responding to the transmitted first to fourth MPDUs 200 to 230 is requested using a single Block ACK Request (BAR) 250. The BAR 250 can include identification information for identifying the first MPDU 200 to the last MPDU 230.

After a time period elapses, the MAC layer receives a BA 260 corresponding to the BAR 250 from the recipient. The BA 260 expresses using a single bitmap, such as '1011', whether the transmitted first to fourth MPDUs 200 to 230 have been successfully received, by assigning a single bit to each of the transmitted first to fourth MPDUs 200 to 230.

The MAC layer confirms using the BA 260 that the second MPDU 210 has not been successfully transmitted and retransmits the second MPDU 210 including the PHY header 240. Thereafter, the MAC layer requests the recipient for another BAR 250 responding to the second MPDU 210, receives another BA 260 from the recipient, and confirms that the second MPDU 210 has been successfully transmitted.

As described above, a plurality of MPDUs are completely transmitted without receiving an ACK responding to each of the plurality of MPDUs, and a single BA is received in response to the plurality of MPDUs, and thus, a waste of channels required to transmit ACKs can be prevented, thereby increasing transmission efficiency. However, if the BA received from a recipient is delayed, subsequent MPDUs cannot be transmitted for the delay time, also resulting in a transmission delay.

Figure 4:
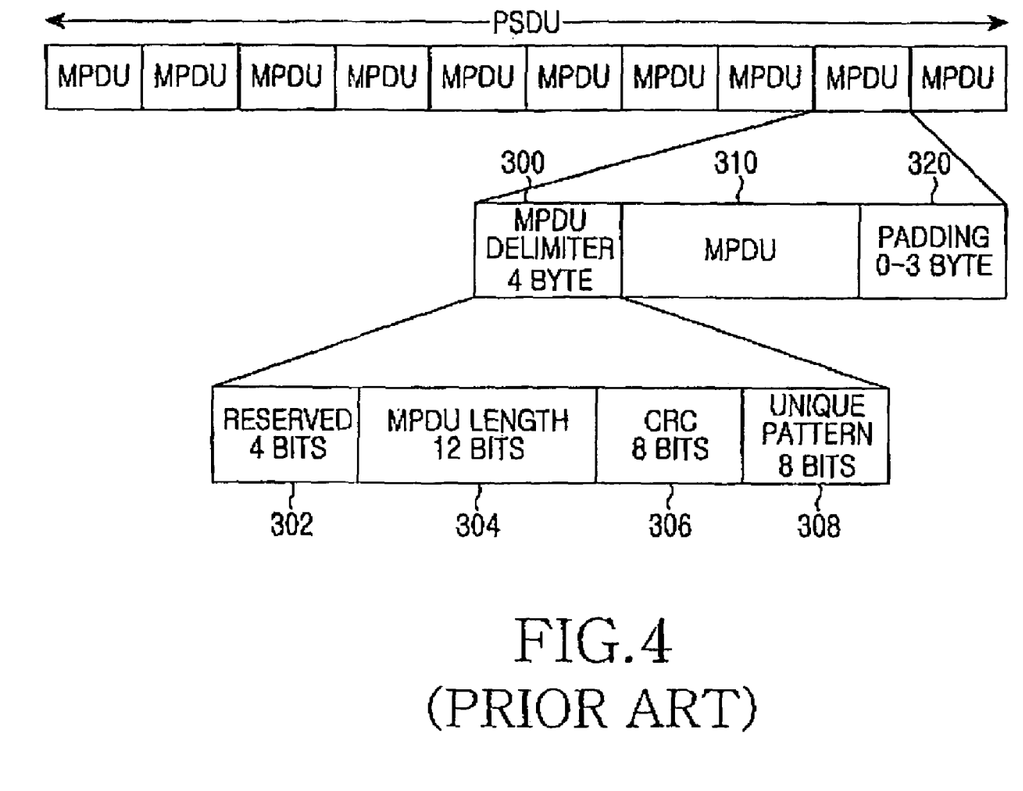
FIG. 4 is a diagram for explaining an aggregation method in which a MAC layer transmits data in a WLAN system.

FIG. 4 is a diagram for explaining an aggregation method in which a MAC layer transmits data in a WLAN system. The aggregation method is a method of transmitting a single Physical Service Data Unit (PSDU) by joining a plurality of (e.g., at least 10) MPDUs.

Referring to FIG. 4, the MAC layer transmits a single PSDU obtained by joining at least 10 MPDUs into a single transmission frame to a recipient. Herein, each of the MPDUs joined to form the single transmission frame includes an MPDU delimiter field 300 for distinguishing it from other MPDUs, an MPDU field 310 and a padding field 320.

The MPDU delimiter field 300 disposed in a fore-end of each of the MPDUs has a 4-byte length, and the padding field 320 has a 4-byte length except the last MPDU, i.e., the tenth MPDU. The MPDU delimiter field 300 includes a 4-bit reserved field 302, a 12-bit MPDU length field 304, an 8-bit Cyclic Redundancy Check (CRC) field 306 for checking a transmission error of the MPDU field 310, which may be generated in a transmission process, and an 8-bit unique pattern field 308.

As described above, the aggregation method of the MAC layer is a method of transmitting a single PSDU by joining and sequentially arranging a plurality of MPDUs, thereby saving resources assigned to a PLCP header and a preamble in transmission of every MPDU. In addition, a time interval, i.e., SIFS, can be saved by sequentially transmitting the plurality of MPDUs. Moreover, even if an error is generated in a certain MPDU during a transmission process, the other MPDUs can be successfully transmitted using the MPDU delimiter field 300.

However, when the number of MPDUs joined into a single PSDU increases, the number of the 4-byte MPDU delimiter fields 300 defined corresponding to the MPDUs also increases. Also, an at least 4 to 7-byte overhead including the padding field 320 corresponding to each of the MPDUs increases according to the number of MPDUs.

The aggregation method has a further problem in that retransmission for an MPDU in which an error is generated during a transmission process is not performed. Hence, the conventional aggregation method needs improvement as to efficiency.

Thus, a technique for efficiently transmitting a plurality of MPDUs, which minimizes a waste of assigned wireless media and minimizes a transmission delay, is required for a WLAN system.

SUMMARY OF THE INVENTION

An object of the present invention is to substantially solve at least the above problems and/or disadvantages and to provide at least the advantages below. Accordingly, an object of the present invention is to provide a method of transmitting service data by minimizing a transmission delay in a WLAN system and a system therefor.

Another object of the present invention is to provide a method in a WLAN system for a MAC layer to transmit a single transmission frame including a plurality of MPDUs and response request information for determining whether a transmission error of each of the MPDUs exists and a system therefor.

According to the present invention, there is provided a method of transmitting service data in a WLAN system, including dividing service data transmitted from an upper layer into a plurality of MPDUs, forming a single transmission frame having the plurality of MPDUs, delimiter information for distinguishing each of the plurality of MPDUs, and ACK request information for requesting for a reception result of the plurality of MPDUs; and adding a single PHY header to the single transmission frame and transmitting the PHY header added transmission frame to a recipient.

According to the present invention, there is provided a method of receiving service data in a WLAN system, including receiving a single transmission frame having a single PHY header, a plurality of MPDUs, delimiter information for distinguishing each of the plurality of MPDUs, and ACK request information for requesting for a reception result of the plurality of MPDUs, through a PHY channel, extracting the plurality of MPDUs from the transmission frame using the delimiter information, determining whether a transmission error of each of the MPDUs exists, and transmitting ACK information indicating whether each of the MPDUs has been successfully received to a sender in response to the ACK request information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness. However, the terminology described below is defined considering functions in the present invention and may vary according to a. Thus, the definitions should be understood based on all the contents of the specification.

The present invention discloses a method of transmitting service data in a WLAN, i.e., a method for a MAC layer to transmit service data transferred from an upper layer by minimizing a transmission delay and an overhead according to data transmission and particularly maximizing a service field.

In the present invention, the MAC layer supports a Distributed Coordination Function (DCF) mode and performs data transmission with a transmission queue in order to prevent collision according to the data transmission between a plurality of wireless links. The MAC layer performs the data transmission by determining whether a wireless medium is busy. The MAC layer considers a back-off time, which is a time delay for transmitting a subsequent transmission frame, at an end time of a current transmission frame. Finally, transmission reliability of transmitted frames is guaranteed using a positive acknowledgement responding to each of the transmitted frames.

In the following description, a WLAN system based on IEEE 802.11 series standards is used. However, it will be understood by those skilled in the art that transmission of a MAC frame may be applicable to other wireless communication systems having a similar technical background and channel type with small changes without largely departing from the spirit and scope of the invention.

Figure 5:
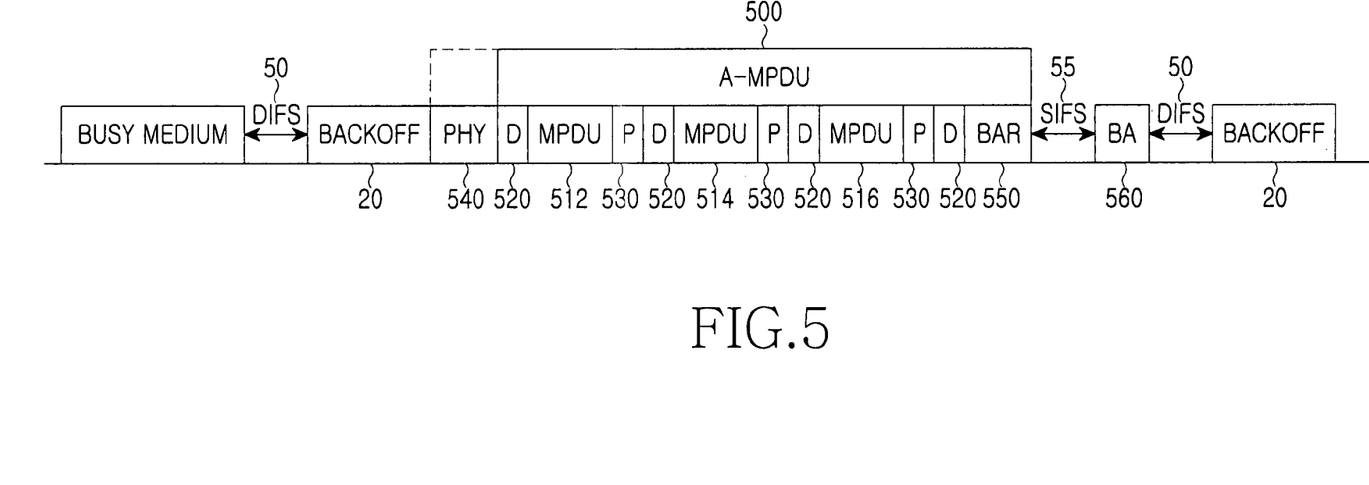
FIG. 5 is a diagram for explaining a structure and transmission process of a newly defined MAC data frame according to the present invention.

FIG. 5 is a diagram for explaining a structure and transmission process of a newly defined MAC data frame according to the present invention.

Referring to FIG. 5, A MAC layer compares the size of an MSDU received from an upper layer, e.g., a Logical Link Control (LLC) layer, to a fragmentation threshold used in the MAC layer and divides the received MSDU into MAC frames smaller than the MSDU. In the specification, it is assumed for convenience of description that the MSDU is divided into 3 MPDUs.

Thus, the MAC layer defines a single transmission unit as an aggregated-MPDU (A-MPDU) 500 including three sequential MPDUs 512, 514 and 516 and a BAR 550 for determining whether the three MPDUs 512, 514 and 516 have been successfully transmitted to a recipient. A PHY layer adds a single PHY header 540 to the A-MPDU 500 transferred from the MAC layer and transmits the PHY header added A-MPDU 500 to the recipient. Herein, each of the MPDUs 512, 514 and 516 further includes an MPDU delimiter field 520 and a padding field 530 for distinction from other MPDUs.

That is, the single A-MPDU 500 disposes the MPDU delimiter field 520 in a fore-end of each information frame in order to distinguish the MPDUs 512, 514 and 516, the PHY header 540 and the BAR 550 from each other. In addition, each MPDU delimiter field 520 has a 4-byte length, and the padding field 530 can be added with a 4-byte length to the first and second MPDUs 512 and 514 except the last MPDU 516.

According to the current embodiment, the A-MPDU 500 transmitted by the MAC layer in a time axis can be described as follows.

The MAC layer, which has sensed that a wireless medium is in the idle state, transmits the A-MPDU 500 including the three sequential MPDUs 512, 514 and 516 and the BAR 550 of the three sequential MPDUs 512, 514, and 516 to the recipient after considering a back-off time 20 next to a DIFS 50. The PHY layer adds the single PHY header 540 to the A-MPDU 500 transferred from the MAC layer and transmits the PHY header added A-MPDU 500 to the recipient.

After waiting for an SIFS 55, the MAC layer receives a BA 560 corresponding to the BAR 550 from the recipient. The BA 560 can be set as a bitmap which by a single bit is assigned to each of the transmitted MPDUs 512, 514 and 516. As a result of checking the BA 560, if it is determined that the three sequential MPDUs 512, 514 and 516 have been successfully transmitted, the MAC layer transmits a subsequent A-MPDU after considering another back-off time 20.

As described above, the MAC layer sets the A-MPDU 500 including the BAR 550 of the three sequential MPDUs 512, 514, and 516 as a single transmission unit. Thus, unlike the prior art, the SIFS 55, which is a time interval for transmitting a separate BAR 550, is not required. In addition, by adding only the single PHY header 540 to the three sequential MPDUs 512, 514 and 516, a wireless resource can be saved.

In addition, as to the all-important expansion of service coverage in a WLAN system, since a transmission data rate is increased due to the smaller number of MPDUs and added headers forming a single transmission frame, data service coverage can be extended when the same power is used.

The system performance of the newly defined A-MPDU according to the present invention will be described later with reference to FIGS. 8A, 8B, 9A and 9B.

Figure 6:
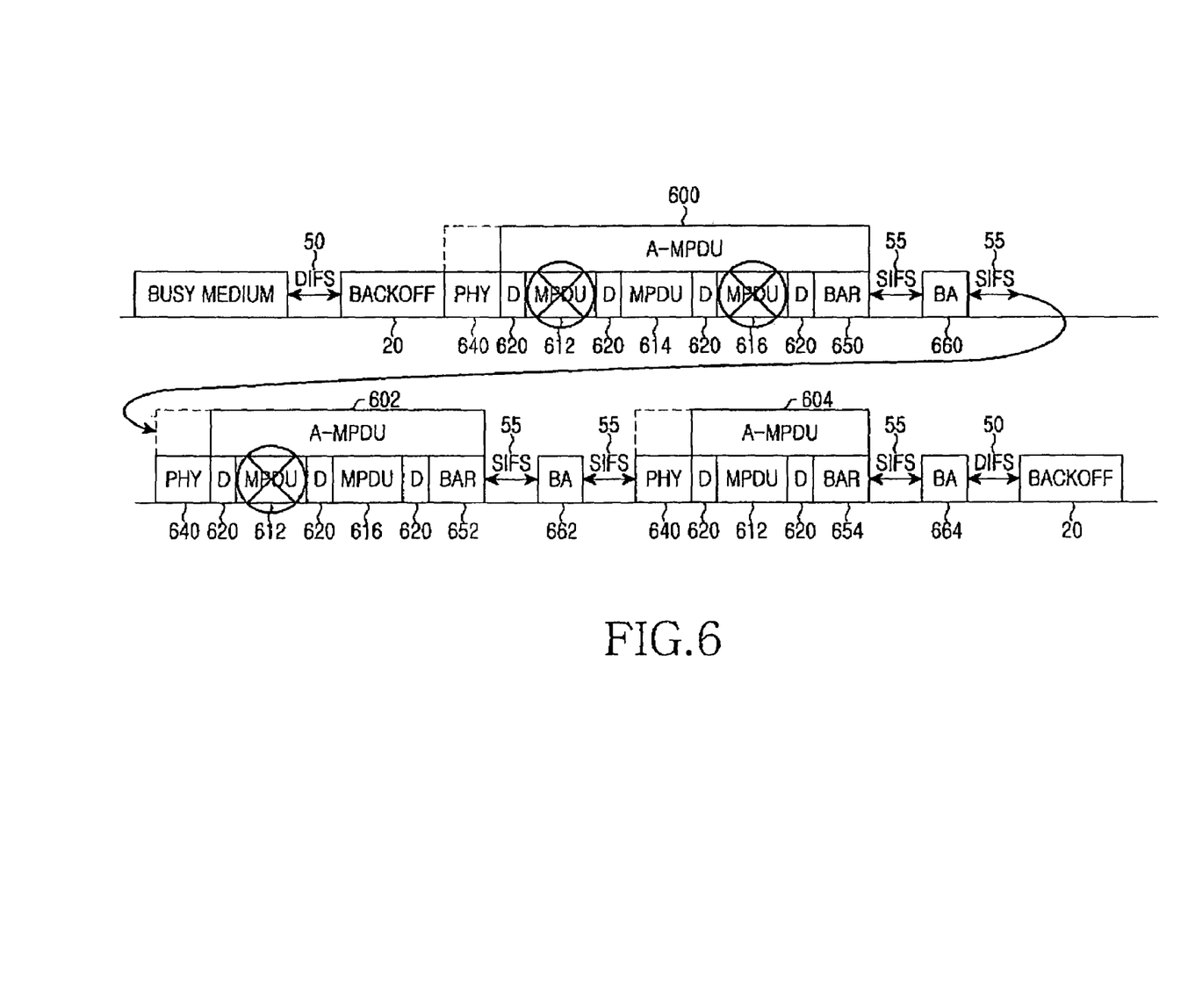
FIG. 6 is a diagram for explaining a re-transmission process of a newly defined MAC data frame according to the present invention.

FIG. 6 is a diagram for explaining a re-transmission process of a newly defined A-MPDU according to the present invention.

Referring to FIG. 6, a MAC layer, which has sensed that a wireless medium is in the idle state, transmits an A-MPDU 600 including three sequential MPDUs 612, 614 and 616 and a BAR 650 of the three sequential MPDUs 612, 614, and 616 to a recipient after considering a back-off time 20 next to a DIFS 50. A PHY layer adds a single PHY header 640 to the A-MPDU 600 transferred from the MAC layer and transmits the PHY header added A-MPDU 600 to the recipient. Herein, each of the MPDUs 612, 614 and 616 further includes an MPDU delimiter field 620 for distinction from other MPDUs, the PHY header 640 or the BAR 650.

After waiting for an SIFS 55, the MAC layer receives a BA 660 corresponding to the BAR 650 from the recipient. The BA 660 can be set as a bitmap which by a single bit is assigned to each of the transmitted MPDUs 612, 614, and 616. For example, if it is assumed that a bit of the BA 660 is set to '1' when a corresponding MPDU has been successfully received and to '0' when the corresponding MPDU has not been successfully received, the BA 660 responding to the three sequential MPDUs 612, 614 and 616 can be set to 0010.

Thus, the MAC layer, which has checked the BA 660, determines that the first and third MPDUs 612 and 616 have not been successfully transmitted and re-transmits an A-MPDU 602 including the first MPDU 612, the third MPDU 616 and a BAR 652 of the first and third MPDUs 612 and 616 after waiting for the SIFS 55. The PHY layer adds a single PHY header 640 corresponding to the first and third MPDUs 612 and 616 to the A-MPDU 602 transferred from the MAC layer and transmits the PHY header added A-MPDU 602 to the recipient.

After waiting for another SIFS 55, the MAC layer receives a BA 662 responding to the A-MPDU 602 from the recipient. As a result of checking the BA 662, if it is determined that the first MPDU 612 has not been successfully transmitted, the BA 662 can be set to 0011, for example.

Thus, the MAC layer, which has checked the BA 662, re-transmits an A-MPDU 604 including the first MPDU 612 and a BAR 654 of the first MPDU 612 after waiting for the SIFS 55. The PHY layer adds a single PHY header 640 corresponding to the first MPDU 612 to the A-MPDU 604 transferred from the MAC layer and transmits the PHY header added A-MPDU 604 to the recipient.

After waiting for another SIFS 55, the MAC layer receives a BA 664 responding to the re-transmitted A-MPDU 604 from the recipient. As a result of checking the BA 664, if it is determined that the first MPDU 612 has been successfully transmitted, the BA 664 can be set to 0111, for example. Thus, the MAC layer transmits a subsequent A-MPDU after considering the back-off time 20 next to the DIFS 50.

As described above, the MAC layer can form a single A-MPDU using a single MPDU. However, a BAR corresponding to certain MPDU(s) is always transmitted with a single A-MPDU. Thus, unlike the prior art, transmission can be still performed without using the SIFS 55, which is a time interval for transmitting a separate BAR or a BA responding to the separate BAR.

Figure 7:
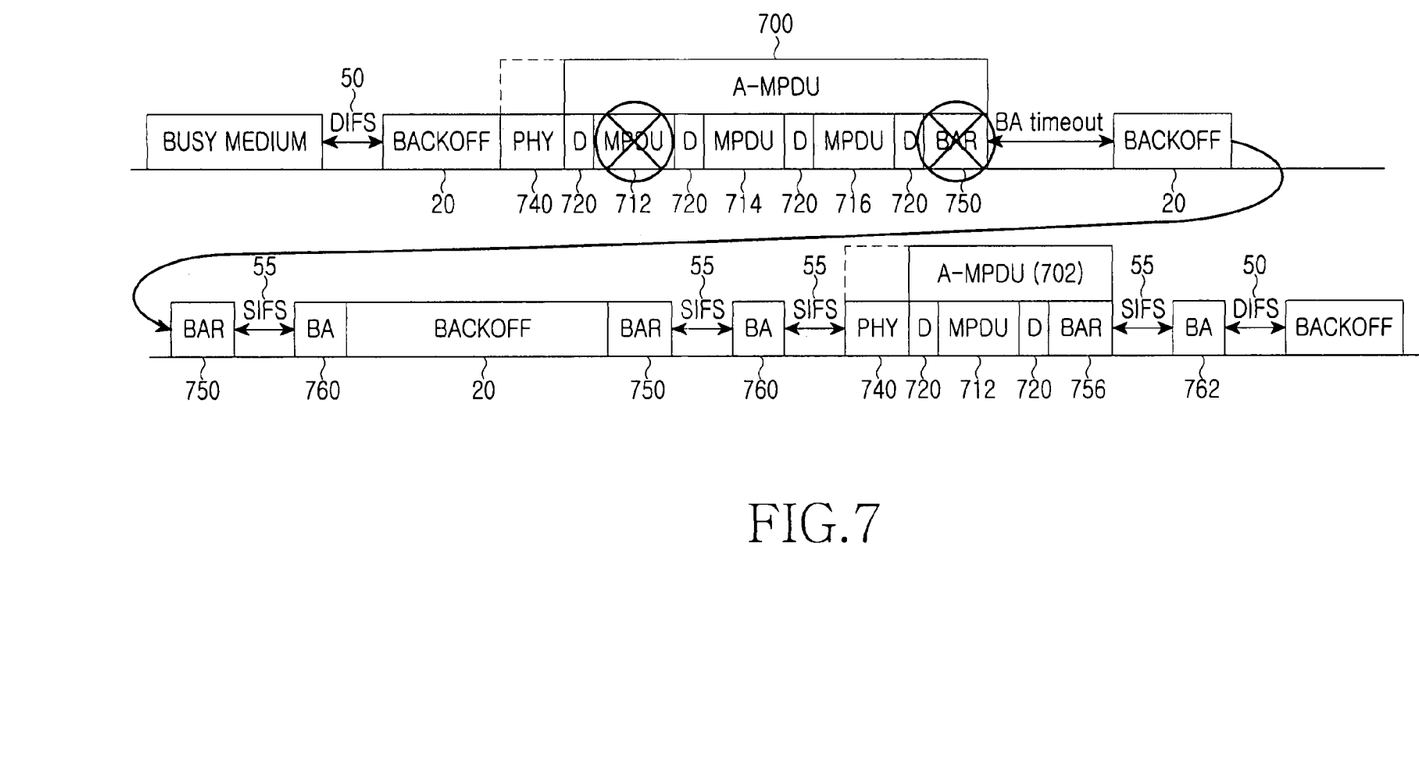
FIG. 7 is a diagram for explaining a re-transmission process of a newly defined MAC data frame according to the present invention.

FIG. 7 is a diagram for explaining a process of re-transmitting a BAR when transmission of the BAR included in a newly defined A-MPDU has failed according to the present invention.

Referring to FIG. 7, a MAC layer, which has sensed that a wireless medium is in the idle state, transmits an A-MPDU 700 including three sequential MPDUs 712, 714 and 716 and a BAR 750 of the three sequential MPDUs 712, 714, and 716 to a recipient after considering a back-off time 20 next to a DIFS 50. A PHY layer adds a single PHY header 740 to the A-MPDU 700 transferred from the MAC layer and transmits the PHY header added A-MPDU 700 to the recipient. Herein, each of the MPDUs 712, 714 and 716 further includes an MPDU delimiter field 720 for distinction from other MPDUs, the PHY header 740 or the BAR 750.

If the BAR 750 has not been successfully received by a recipient due to an error generated therein during a transmission process, i.e., if the MAC layer senses that a response time of a BA has elapsed, the MAC layer separately transmits the BAR 750 of the MPDUs 712, 714 and 716. Herein, the MAC layer can re-transmit the BAR 750 after waiting for the back-off time 20.

After re-transmitting the BAR 750, the MAC layer waits for a BA 760 to be received from the recipient in response to the BAR 750 after an SIFS 55. If the MAC layer senses that a response time of the BA 760 has elapsed, the MAC layer re-transmits the BAR 750 after waiting for the back-off time 20.

After re-transmitting the BAR 750, the MAC layer receives a BA 760 from the recipient. Thus, the MAC layer determines that the first MPDU 712 has not been successfully transmitted and re-transmits an A-MPDU 702 including the first MPDU 712 and a BAR 756 of the first MPDU 712 to the recipient after waiting for the SIFS 55.

The MAC layer receives a BA 762 corresponding to the A-MPDU 702 from the recipient after waiting for the SIFS 55. Thus, the MAC layer transmits a subsequent A-MPDU after considering the back-off time 20 next to the DIFS 50.

Accordingly, if transmission of a BAR has failed, the MAC layer re-transmits only the BAR after waiting for the back-off time 20. Although a transmission delay due to the back-off time 20 is generated, transmission reliability is guaranteed by re-transmitting an MPDU in which an error is generated during a transmission process.

An operation of a recipient will now be described with reference to FIGS. 5 to 7.

A PHY layer of the recipient receives an A-MPDU having a single PHY header defined according to the present invention through a wireless channel. The PHY layer detects address information of the recipient from the PHY header and transfers the received A-MPDU to a MAC layer of the recipient. Herein, the A-MPDU transferred to the MAC layer includes a plurality of sequentially arranged MPDUs, delimiter information for distinguishing the MPDUs from each other, and BAR information for requesting for a reception result of the MPDUs.

The MAC layer distinguishes the MPDUs and the BAR information included in the A-MPDU from each other using the delimiter information. The MAC layer determines whether each of the MPDUs has been successfully received and forms BA information in a bitmap type in response to the BAR information to indicate whether each of the MPDUs has been successfully received. The formed BA information is transferred to the PHY layer, and the PHY layer transmits the BA information to a sender after an SIFS elapses from when the A-MPDU was received. If it is determined that at least one of the MPDUs has not been successfully received, the PHY layer receives the at least one of the MPDUs re-transmitted in response to the BA information after a back-off time elapses from when the A-MPDU was received.

FIGS. 8A, 8B, 9A and 9B are graphs illustrating system performances.

Prior to comparison of system performances, conditions for the performance comparison are defined. The size of service data (MSDU) received by a MAC layer from an upper layer may not exceed 2304 bytes. In the following description, the size of MSDU is set to 1582 bytes.

In addition, the following four transmission method instances are defined for the system performance comparison:

1. A single MSDU is transmitted (the fragmentation method of the prior art is not used)
2. The 802.11 series fragmentation method illustrated in FIG. 2 is used and an ACK is transmitted in response to each of MAC fragments (7 MAC fragments: the size of a single MSDU is 256 bytes)
3. An A-MPDU is transmitted with BAR/BA defined according to the present invention (7 MAC fragments: the size of a single MSDU is 256 bytes)
4. An A-MPDU is transmitted with BAR/BA defined according to the present invention (14 MAC fragments: the size of a single MSDU is 143 bytes)

Figure 8A:
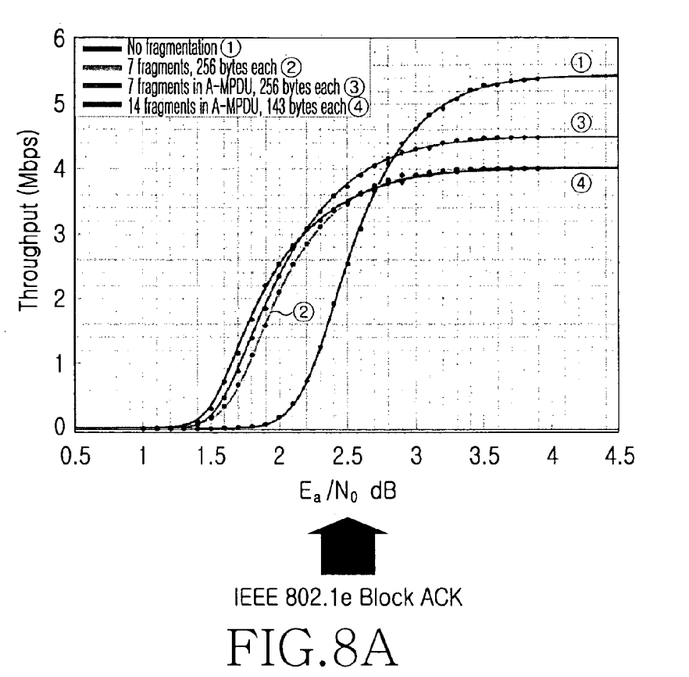
FIGS. 8A and 8B are graphs illustrating a result of comparing system performances according to the present invention to system performances according to the prior art when a transmission rate is 6 Mbps.
Figure 8B:
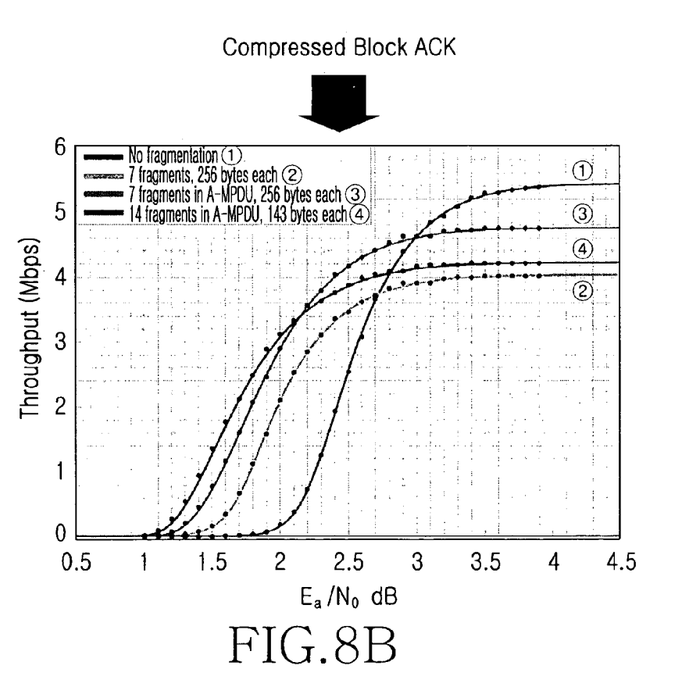

FIGS. 8A and 8B are graphs illustrating a result of comparing system performances according to the 4 transmission methods when a transmission rate is 6 Mbps. A mode of a PHY layer is Binary Phase-Shift Keying (BPSK), ½ rate. In FIGS. 8A and 8B, a bitmap size of a BA is variable. That is, a 128-byte long bitmap of IEEE 802.11 is used in FIG. 8A, and a compressed 8-byte BA bitmap is used in FIG. 8B.

Figure 9A:
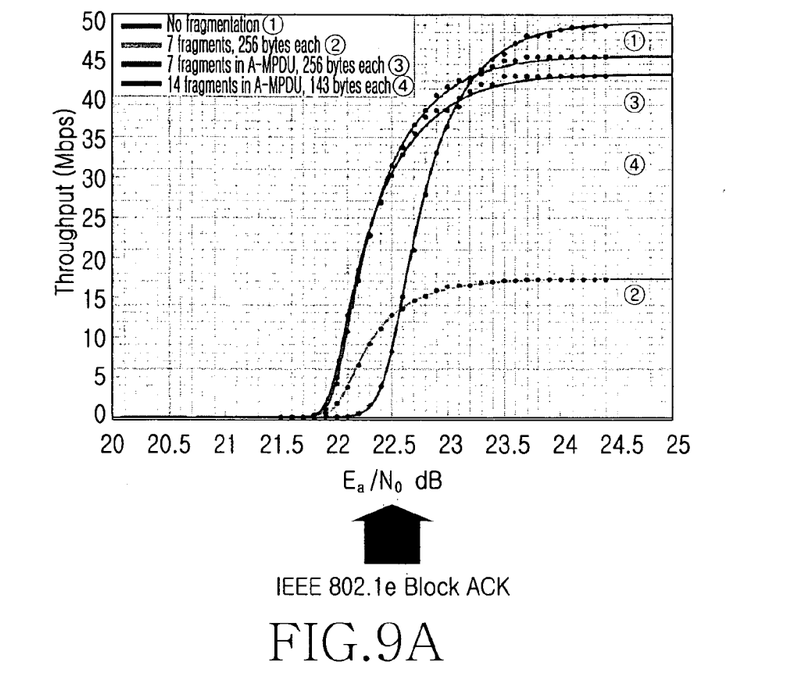
FIGS. 9A and 9B are graphs illustrating a result of comparing system performances according to the present invention to system performances according to the prior art when a transmission rate is 135 Mbps.
Figure 9B:
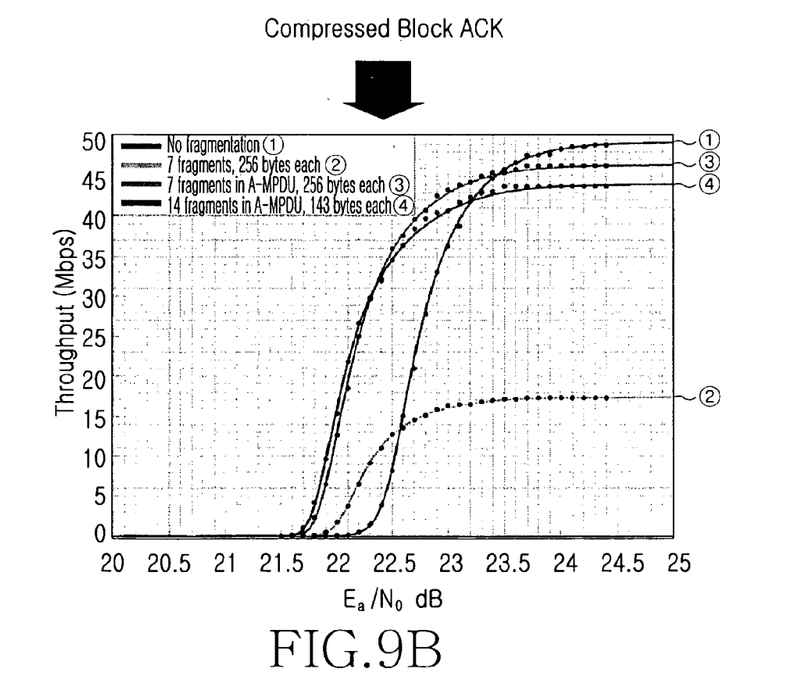

FIGS. 9A and 9B are graphs illustrating a result of comparing system performances according to the 4 transmission methods when a transmission rate is 135 Mbps. A mode of a PHY layer is 64 Quadrature Amplitude Modulation (QAM), ¾ rate. The 128-byte long bitmap of IEEE 802.11 is used in FIG. 9A, and the compressed 8-byte BA bitmap is used in FIG. 9B.

As illustrated in FIGS. 8A, 8B, 9A and 9B, regardless of an unstable wireless link state, the transmission methods (Nos. 3 and 4) of an A-MPDU according to the present invention maintain stability in a channel performance. In addition, since the transmission methods maintain gentle slopes regardless of a channel state, stability in overall system performance is promoted.

As illustrated in FIGS. 9A and 9B, the present invention shows improved system performances in high-speed data transmission. That is, the transmission methods (Nos. 3 and 4) of an A-MPDU according to the present invention in high-speed data transmission guarantee stability in overall system performance.

As described above, according to the present invention, a wireless service coverage in which service data can be transmitted can be maximally extended by a transmission MAC layer aggregating a plurality of MAC frames and transmitting the aggregated MAC frames as a single transmission frame. In addition, by inserting BAR information for requesting whether the plurality of MAC frames are re-transmitted into the single transmission frame, the BAR information can be transmitted and BA information can be received without an additional time delay, and thus more service data can be transmitted in the same period of time, resulting in a high efficiency of a system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting service data in a Wireless Local Area Network (WLAN) system, the method comprising:
    dividing service data transmitted from an upper layer into a plurality of Media Access Control Protocol Data Units (MPDUs) in a Media Access Control (MAC) layer;
    forming a first and single transmission frame including the plurality of MPDUs destined for a first address, block acknowledgement (ACK) request information identifying each of the plurality of MPDUs and requesting a reception result of each of the plurality of MPDUs in the MAC layer, and delimiter information for distinguishing each of the plurality of MPDUs and also for distinguishing the block ACK request information;
    adding only a first and single physical (PHY) header to a first MPDU of the first and single transmission frame such that no other header is found in the first and single transmission frame in a physical (PHY) layer and transmitting the first and single PHY header added first and single transmission frame to a recipient; and
    determining whether the block ACK request information was successfully received by the recipient,
    wherein, in response to determining that the block ACK was not successfully received, the method further comprises retransmitting the block ACK request information by itself.

2. The method of claim 1, further comprising:
    receiving ACK information indicating a reception result of the plurality of MPDUs from the recipient in response to the first ACK request information; and
    adding a second PHY header to a second transmission frame including at least one MPDU in which a transmission error was generated, second delimiter information and second ACK request information and re-transmitting the second PHY header added second transmission frame to the recipient.

3. The method of claim 2, wherein the ACK information is received from the recipient in response to the ACK request information after an ACK waiting time from when the first and single transmission frame was transmitted elapses.

4. The method of claim 1, wherein the ACK request information is information for requesting a block ACK indicating a reception result of the plurality of MPDUs.

5. The method of claim 2, wherein the ACK information is a bitmap type block ACK indicating a reception result of the plurality of MPDUs.

6. The method of claim 3, further comprising re-transmitting the ACK request information of the MPDUs to the recipient after a back-off time from when the first and single transmission frame was completely transmitted elapses, if the ACK information is not received from the recipient within the ACK waiting time in response to the ACK request information.

7. The method of claim 2, wherein the transmission frame including at least one MPDU in which a transmission error was generated is transmitted after a back-off time from when the first and single transmission frame was completely transmitted elapses.

8. A method of receiving service data in a Wireless Local Area Network (WLAN) system, the method comprising:
    receiving a first and single transmission frame comprising a first and single physical (PHY) header attached to a first MPDU and such that no other header is found in the first and single transmission frame, a plurality of Media Access Control Protocol Data Units (MPDUs) destined for a first address including the first MPDU, block acknowledgement (ACK) request information identifying each of the plurality of MPDUs and requesting a reception result of each of the plurality of MPDUs, and delimiter information for distinguishing each of the plurality of MPDUs and also for distinguishing the block ACK request information, through a PHY channel;

extracting the plurality of MPDUs from the first and single transmission frame using the delimiter information;

determining whether a transmission error of each of the MPDUs exists; and transmitting ACK information indicating whether each of the MPDUs has been successfully received to a sender in response to the ACK request information, wherein, in response to the block ACK request information not being successfully received, the method waits until the block ACK request information is separately received in a transmission including the block ACK request information by itself, and subsequently performs the steps of determining and transmitting.

9. The method of claim 8, wherein the ACK information is a bitmap type block ACK corresponding to each of the plurality of MPDUs.

10. The method of claim 9, wherein the ACK information is received from the sender after an ACK waiting time from when the first and single transmission frame was received elapses.

11. The method of claim 10, further comprising re-receiving a second transmission frame including a single PHY header, at least one MPDU in which a transmission error was generated, delimiter information for distinguishing each of the MPDUs, and ACK request information for requesting for a reception result of the MPDUs from the sender after the ACK waiting time from when the ACK information was transmitted elapses.

12. An apparatus for transmitting service data in a Wireless Local Area Network (WLAN) system, the apparatus comprising:

a Media Access Control (MAC) layer for dividing service data transmitted from an upper layer into a plurality of MAC Protocol Data Units (MPDUs) destined for a first address and forming a first and single transmission frame including the plurality of MPDUs, block acknowledgement (ACK) request information identifying each of the plurality of MPDUs and requesting a reception result of each of the plurality of MPDUs, and delimiter information for distinguishing each of the plurality of MPDUs and also for distinguishing the block ACK request information;

a physical (PHY) layer for adding a first and single PHY header to a first MPDU of the first and single transmission frame such that no other header is found in the first and single transmission frame and transmitting the first and single PHY header added first and single transmission frame to a recipient; and a transmitter for transmitting the transmission frame, wherein the apparatus determines whether the block ACK request information is received by the recipient, and in response to determining that the block ACK request information was not successfully received, the transmitter retransmits the block ACK request information by itself.

13. The apparatus of claim 12, wherein the MAC layer receives ACK information indicating a reception result of the plurality of MPDUs from the recipient in response to the ACK request information, adds a single PHY header to a second transmission frame including at least one MPDU in which a transmission error was generated, delimiter information, and ACK request information, and re-transmits the single PHY header added second transmission frame to the recipient.

14. The apparatus of claim 13, wherein the MAC layer receives the ACK information from the recipient in response to the ACK request information after an ACK waiting time from when the first and single transmission frame was transmitted elapses.

15. The apparatus of claim 12, wherein the ACK request information is information for requesting a block ACK indicating a reception result of the plurality of MPDUs.

16. The apparatus of claim 13, wherein the ACK information is a bitmap type block ACK indicating a reception result of the plurality of MPDUs.

17. The apparatus of claim 14, wherein the MAC layer re-transmits the ACK request information of the MPDUs to the recipient after a back-off time from when the first and single transmission frame was completely transmitted elapses, if the ACK information is not received from the recipient within the ACK waiting time in response to the ACK request information.

18. The apparatus of claim 13, wherein the second transmission frame including at least one MPDU in which a transmission error was generated is transmitted after a back-off time from when the first and single transmission frame was completely transmitted elapses.

19. An apparatus for receiving service data in a Wireless Local Area Network (WLAN) system, the apparatus comprising:

a physical (PHY) layer for receiving through a channel a first and single transmission frame including:
    a first and single PHY header attached to a first MPDU and such that no other header is found in the transmission frame,
    a plurality of Media Access Control Protocol Data Units (MPDUs) destined for a first address including the first MPDU,
    block acknowledgement (ACK) request information identifying each of the plurality of MDPUs and requesting a reception result of each of the plurality of MPDUs; and
    delimiter information for distinguishing each of the plurality of MPDUs and also for distinguishing the block ACK request information;

a Media Access Control (MAC) layer for extracting the plurality of MPDUs from the first and single transmission frame using the delimiter information, determining whether a transmission error of each of the MPDUs exists, forming ACK information indicating whether each of the MPDUs has been successfully received in response to the ACK request information, and transmitting the formed ACK information through the PHY layer, wherein, in response to the block ACK request information not being successfully received, the apparatus waits until the block ACK request information is separately received in a transmission including the block ACK request information by itself, and the MAC layer subsequently performs the steps of determining and transmitting.

20. The apparatus of claim 19, wherein the ACK information is a bitmap type block ACK corresponding to each of the plurality of MPDUs.

21. The apparatus of claim 19, wherein the ACK information is received from the sender after an ACK waiting time from when the first and single transmission frame was received elapses.

22. The apparatus of claim 20, wherein the MAC layer re-receives a second transmission frame including a first and single PHY header, at least one MPDU in which a transmission error was generated, delimiter information for distinguishing each of the MPDUs, and ACK request information for requesting for a reception result of the MPDUs from the sender after an ACK waiting time from when the ACK information was transmitted elapses.

* * * * *